(12) United States Patent
Arndt et al.

(10) Patent No.: US 11,626,224 B2
(45) Date of Patent: Apr. 11, 2023

(54) COIL DEVICE AND WINDING CARRIER FOR LOW-POLE ROTOR

(71) Applicant: Siemens Energy Global GmbH & Co. KG, Munich (DE)

(72) Inventors: Tabea Arndt, Erlangen (DE); Marijn Pieter Oomen, Erlangen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 342 days.

(21) Appl. No.: 16/625,662

(22) PCT Filed: Jun. 28, 2017

(86) PCT No.: PCT/EP2017/065955
§ 371 (c)(1),
(2) Date: Dec. 20, 2019

(87) PCT Pub. No.: WO2019/001696
PCT Pub. Date: Jan. 3, 2019

(65) Prior Publication Data
US 2020/0126700 A1   Apr. 23, 2020

(51) Int. Cl.
*H01F 6/06* (2006.01)
*H02K 3/02* (2006.01)
(Continued)

(52) U.S. Cl.
CPC .............. *H01F 6/06* (2013.01); *H01F 27/06* (2013.01); *H01F 41/048* (2013.01); *H02K 3/02* (2013.01)

(58) Field of Classification Search
CPC .......... H01F 6/06; H01F 27/06; H01F 41/048; H02K 3/02
See application file for complete search history.

(56) References Cited

U.S. PATENT DOCUMENTS 7,741,738 B2   6/2010  Ries ................. 310/52
9,852,841 B2  12/2017  Sakiyama et al.
(Continued)

FOREIGN PATENT DOCUMENTS

| CN | 1745512 A | 3/2006 | ............... H02K 3/52 |
| CN | 101855682 A | 10/2010 | ............. H01F 27/28 |

(Continued)

OTHER PUBLICATIONS

Chinese Office Action, Application No. 201780092544.7, 7 pages, dated Mar. 1, 2021.
(Continued)

*Primary Examiner* — Bernard Rojas
(74) *Attorney, Agent, or Firm* — Slayden Grubert Beard PLLC

(57) ABSTRACT

Various embodiments include a superconducting coil device comprising: a coil winding with at least one turn of a superconducting strip conductor; wherein the strip conductor has a first main face and a second main face. The coil winding includes a turning region wherein the strip conductor is bent such that, in the turning region, the strip conductor has a distinct change of direction in a longitudinal direction and simultaneously changes the orientation of both the first main face and the second main face with respect to a central axis of the coil device.

11 Claims, 3 Drawing Sheets

(51) Int. Cl.
*H01F 27/06* (2006.01)
*H01F 41/04* (2006.01)

(56) References Cited

U.S. PATENT DOCUMENTS

| | | | |
|---|---|---|---|
| 2004/0122638 A1 | 6/2004 | Niemann et al. | 703/2 |
| 2006/0293189 A1 | 12/2006 | Ries | 505/100 |
| 2009/0051241 A1 | 2/2009 | Wiezoreck | 310/195 |
| 2009/0058592 A1 | 3/2009 | Leghissa et al. | 336/225 |
| 2009/0083967 A1 | 4/2009 | Meinke et al. | 29/602.1 |
| 2013/0172196 A1 | 7/2013 | Nick et al. | 505/166 |
| 2013/0212872 A1 | 8/2013 | Meinke | 29/605 |
| 2015/0213948 A1 | 7/2015 | Sakiyama et al. | 363/125 |
| 2016/0118172 A1* | 4/2016 | Batz | H01F 41/048 505/211 |
| 2016/0216347 A1 | 7/2016 | Roth et al. | 324/322 |
| 2017/0084371 A1* | 3/2017 | Batz | H01F 41/12 |
| 2018/0204671 A1 | 7/2018 | Arndt et al. | |
| 2019/0267885 A1* | 8/2019 | Frank | H02K 55/04 |
| 2021/0143694 A1* | 5/2021 | Arndt | H02K 55/04 |

FOREIGN PATENT DOCUMENTS

| | | | | |
|---|---|---|---|---|
| DE | 10 2008 035 655 A1 | 2/2009 | | H02K 55/00 |
| DE | 10 2010 040 272 A1 | 3/2012 | | H01F 6/06 |
| JP | 4846529 A | 7/1973 | | C23G 1/10 |
| JP | 49148401 U | 12/1974 | | H02K 3/04 |
| JP | 61191246 A | 8/1986 | | H02K 1/16 |
| JP | 02133115 A | 5/1990 | | B21D 11/00 |
| JP | 0982154 A | 3/1997 | | C01G 1/00 |
| JP | 2006515980 A | 6/2006 | | H02K 55/04 |
| JP | 2009049040 A | 3/2009 | | H01F 6/06 |
| JP | 2010118457 A | 5/2010 | | H01B 12/06 |
| JP | 2015159278 A | 9/2015 | | H01F 27/28 |
| WO | 2006/111527 A1 | 10/2006 | | H01F 41/04 |
| WO | 2017/005619 A1 | 1/2017 | | H01F 27/28 |
| WO | 2019/001696 A1 | 1/2019 | | H01F 6/06 |

OTHER PUBLICATIONS

Japanese Office Action, Application No. 2019571209, 7 pages, dated Jan. 5, 2021.
Oomen, Marijn P. et al., "Transposed-Cable Coil & Saddle Coils of HTS for Rotating Machines: Test Results at 30k," IEEE Transactions on Applied Superconductivity 19, No. 3, Part 2, pp. 1633-1638, 2009.
International Search Report and Written Opinion, Application No. PCT/EP2017/065955, 21 pages, dated Mar. 27, 2018.
Chinese Notice of Allowance, Application No. 201780092544.7, 7 pages, dated Apr. 13, 2022.
Japanese Notice of Allowance, Application No. 2019-571209, 5 pages, dated Oct. 18, 2022.

* cited by examiner

COIL DEVICE AND WINDING CARRIER FOR LOW-POLE ROTOR

CROSS-REFERENCE TO RELATED APPLICATIONS

This application is a U.S. National Stage Application of International Application No. PCT/EP2017/065955 filed Jun. 28, 2017, the contents of which are hereby incorporated by reference in their entirety.

TECHNICAL FIELD

The present disclosure relates to electrical machines. Various embodiments may include superconducting coil devices having at least one coil winding, rotors for an electrical machine having such a coil device, and/or winding carriers for such a coil winding, and a production method for these.

BACKGROUND

Superconducting strip conductors, in particular those having flat, thin superconducting coatings on metallic substrate strips, exhibit promising properties for the production of coil windings. These may be, in particular, rotor windings or stator windings of electrical machines, but also magnet coils or other types of coil windings. The general advantage of using such superconducting strip conductors is that, at a temperature below the transition temperature of the superconductor, a current can flow almost loss-free.

A problem in the production of coil windings is that such superconducting strip conductors are generally very sensitive to mechanical loads. Thus, mechanical stresses during the production of a winding can easily result in damage to the superconducting layer, in particular in delamination of parts of the layer and/or in degradation of the superconducting properties. The known superconducting strip conductors are particularly sensitive with respect to the occurrence of a bend within the strip plane—i.e. with respect to bending about an axis perpendicular to the strip plane. For geometrical reasons, the local strain is particularly high in some strip regions. In principle, however, other pronounced bends of the strip conductor should also be minimized as far as possible during the manufacture of such a winding, in order to avoid damage.

For these reasons, windings of superconducting strip conductors are usually produced in the form of flat coils. A flat coil is a coil that is wound around a fixed winding axis within a constant planar winding plane. In the production of such a winding, the superconducting layer of the strip conductor is subjected to comparatively little mechanical stress, since bending occurs only around the winding axis, which is parallel to the transverse direction of the strip conductor. In the case of such a planar winding, advantageously, both torsion of the strip conductor and bending within the strip plane are avoided. The production of flat coils has thus become established as the most common and the most gentle way of producing superconducting windings.

However, the use of superconducting flat coils has disadvantages for some types of applications. Thus, for some applications, it would be advantageous if coils having a three-dimensional geometry were also available. A three-dimensional geometry in this context is be understood to mean that the coil winding is shaped such that its winding plane is not constant, i.e. that it departs from the planar coil shape. This may be, for example, a saddle coil.

For example, the use of a three-dimensionally shaped coil winding is advantageous for application as a rotor winding in a rotor of an electrical machine that has a small number of poles. In the case of such a low number of poles, in particular in the case of a pole number of p=2, it is advantageous to arrange the electrically effective longitudinal limbs of the coil winding in the direction of the rotor axis and as close as possible to the so-called equatorial plane that includes this axis. However, this is often not possible in the case of a flat coil winding, since it is necessary for the center of the rotor to be kept clear in the region of the rotor axis, and without bending of the winding the transverse limbs then also run very close to the axis. For example, it may be necessary to keep the axis clear for the arrangement of a rotor shaft for the purpose of torque transmission, for the purpose of supplying coolant, for rotordynamic-mechanical reasons and/or for the arrangement of electrical infeed lines in the region of the axis. It is therefore often necessary to make compromises in the production of coil devices for such a low-pole rotor having superconducting flat coils. Thus, for example, such flat coils are often arranged further away from the equatorial plane than would be desirable for electrical or electrodynamic reasons.

Thus, in the case of superconducting strip conductors, also, there is fundamental need to produce three-dimensionally shaped coil windings. Hitherto, this could be achieved, for example, by retroactively bending a flat-wound oval winding into the shape of a cylinder surface, as described, for example, in M. P. Oomen et al, "Transposed-cable coil & saddle coils of HTS for rotating machines: test results at 30K", IEEE Trans. Appl. Superconductivity 19-3, p. 1633-1638 (2009). Another known possibility, as described in DE 10 2008 035 655 A1, consists in winding the strip conductor already in three dimensions. In order to avoid pronounced bending of the strip conductor, however, in both cases space-consuming winding overhangs are required in order to connect the longitudinal limbs of the winding in their axial end regions and, at the same time, to avoid small bend radii of the strip conductor. Owing to these winding overhangs, a large amount of space is required, and a rotor produced with such windings is therefore comparatively long, which in turn contributes to a high weight and a greater consumption of material.

SUMMARY

The teachings of the present disclosure describe coil devices that avoids the stated disadvantages. In particular, some embodiments include a coil device having a coil winding of a superconducting strip conductor, which is three-dimensional in form and which nevertheless has a comparatively small space requirement for the winding overhangs, without the strip conductor being damaged by the mechanical stress during winding, rotors having such a coil device, and/or winding carriers for a coil winding of this coil device, and methods for the production of the coil windings.

As an example, some embodiments include a superconducting coil device (23) having at least one coil winding (21,21a-21d), comprising at least one turn (w) of a superconducting strip conductor (1), wherein the strip conductor (1) has a first (3) and a second (5) main face, wherein the coil winding (21,21a-21d) has at least one turning region (7), in which the strip conductor (1) is bent such that, in this turning region (7), it has a distinct change of direction in its longitudinal direction (a1,a2) and simultaneously changes the orientation of its two main faces (3,5) with respect to a central axis (A) of the coil device (23).

In some embodiments, the minimum bend radius r of the strip conductor (1) within the turning region (7) is between 1 cm and 25 cm.

In some embodiments, there is at least one winding carrier (15), on which the at least one coil winding (21,21a-21d) is held such that it rests on the winding carrier (15), at least in the at least one turning region (7).

In some embodiments, the strip conductor (1) has a substrate strip and a high-temperature superconducting layer arranged thereon.

In some embodiments, the turning region (7) is a spatially highly limited sub-region of the total circumference of the coil winding (21,21a-21d).

In some embodiments, the at least one coil winding (21,21a-21d) has two longitudinal limbs (9), which extend along a central axis (A) of the coil device (23), has two axially terminal transverse limbs (11), which connect the two longitudinal limbs (9) to each other in their two axial end regions, and in the transition regions between the longitudinal limbs (9) and the transverse limbs (11), has a total of four turning regions (7).

In some embodiments, the two longitudinal limbs (9) have a mutually equal radial distance r1 from the central axis (A) and the two transverse limbs (11) have a mutually equal radial distance r2 from the central axis (A), wherein these two radial distances (r1,r2) differ from each other by a value d of between 2 cm and 20 cm.

In some embodiments, the two longitudinal limbs (9) have a radial distance r1 from the central axis (A) that is greater than the corresponding radial distance r2 of the two transverse limbs (11).

In some embodiments, the two longitudinal limbs (9) have a radial distance r1 from the central axis (A) that is less than the corresponding radial distance r2 of the two transverse limbs (11). In some embodiments, the two longitudinal limbs (9) are each curved in an S shape in their axial end regions (9b), such that the radial distance of the winding from the central axis (A) in these end regions (9b) is altered with respect to the more inner portions (9a).

As another example, some embodiments include a rotor (25) for an electrical machine, having at least one coil device (23) as described above.

In some embodiments, the rotor provides a magnetic field having p poles, wherein p is equal to 2 or 4.

As another example, some embodiments include a winding carrier (15) for a three-dimensionally shaped coil winding (21,21a-21d), having a ring-shaped circumferential bearing contact surface (17) for flat bearing contact of a superconducting strip conductor (1), wherein the bearing contact surface (17) has at least one turning region (7), in which the bearing contact surface (17) is bent such that, in this turning region (7), it causes a distinct change of direction in the longitudinal direction (a1,a2) of a strip conductor (1) in bearing contact and, at the same time, the orientation of the two main faces (3,5) of a strip conductor (1) in bearing contact changes with respect to a central axis (A) of the coil device (23).

In some embodiments, the carrier is composed of at least two segments, in such a manner that it can subsequently be removed from a coil winding applied to it, wherein the coil winding (23) is able to retain the shape defined by the bearing contact surface (17).

As another example, some embodiments include a method for producing a superconducting coil winding (23), in which at least one turn (w) of a superconducting strip conductor (1) is wound onto a winding carrier (15), such that a first main face (3) of the strip conductor comes to lie flatly on the bearing contact surface (17) of the winding carrier (15).

BRIEF DESCRIPTION OF THE DRAWINGS

The teachings here are described in the following on the basis of some exemplary embodiments, with reference to the appended drawings, in which.

DETAILED DESCRIPTION

Figure 1:
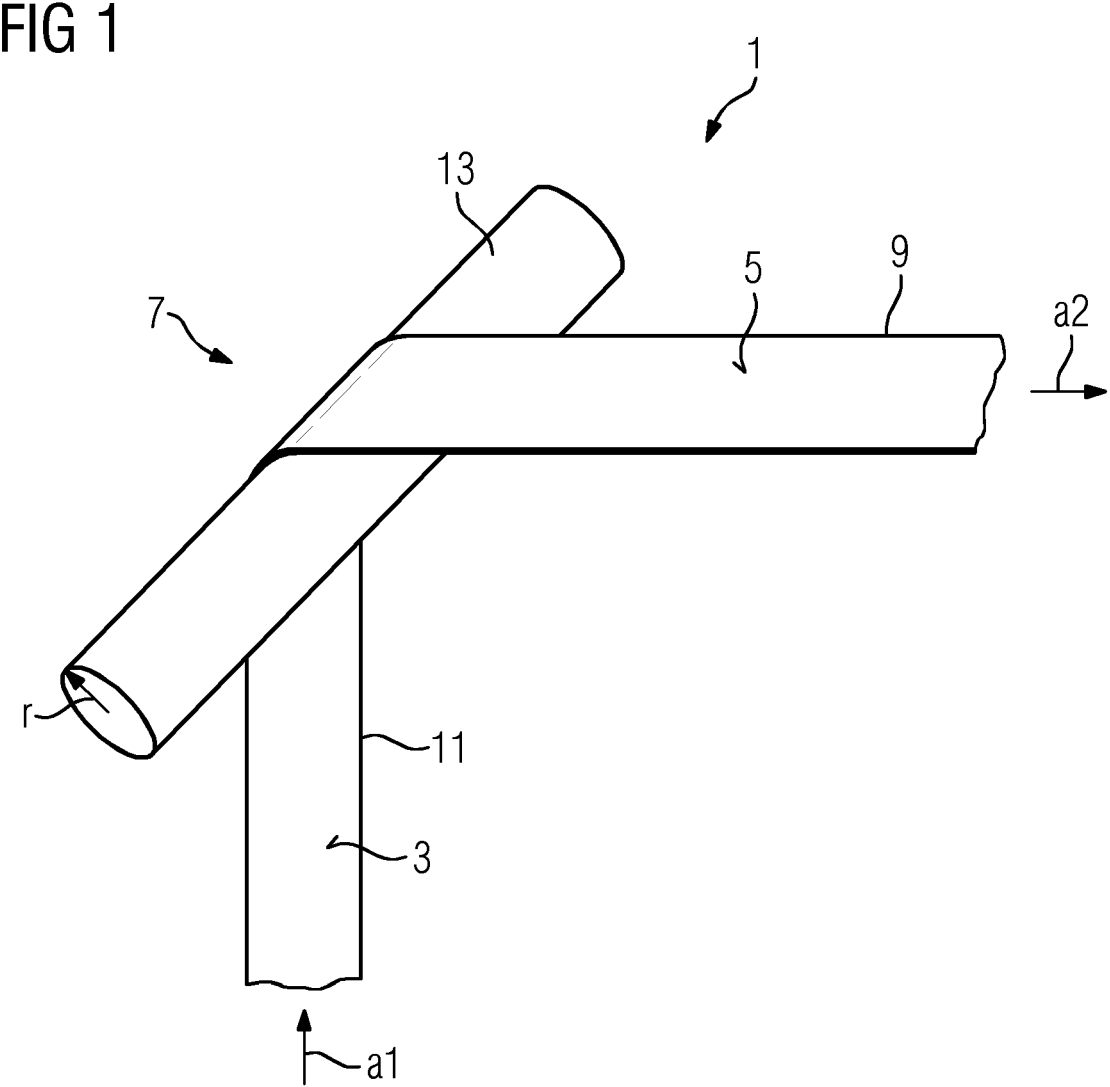
FIG. 1 shows a schematic representation of a strip conductor of a superconducting coil device, in a turning region.

In some embodiments, a superconducting coil device incorporating the teachings herein comprises at least one coil winding, which in turn has at least one turn of a superconducting strip conductor. This strip conductor has a first and a second main face. The coil winding has at least one turning region, in which the strip conductor is bent such that, in this turning region, it has a distinct change of direction in its longitudinal direction and simultaneously changes the orientation of its two main faces with respect to a central axis of the coil device.

The above-mentioned term "distinct change of direction" is to be understood to mean that the strip conductor not only changes the orientation of its main faces, but also deflects at the same time. Such a deflection may be associated, for example, with a change of direction of the longitudinal direction of between 45° and 135°. In some embodiments, the change of direction may be approximately 90°, thus, for example, between 70° and 110°, or between 80° and 100°. Such a pronounced change of direction, in the region of approximately 90°, has the effect that the direction of the strip conductor can change relatively abruptly between the direction of longitudinal limbs and transverse limbs of a winding, and thus a comparatively small amount of axial space is required for the winding overhangs.

The above-mentioned change of orientation of the main faces is to be understood to mean that the strip conductor is turned at the same time as being deflected. The central axis of the coil device may in this case be, for example, a rotor axis or other central symmetry axis. Thus, in the above-mentioned turning region, the alignment of the two main faces of the strip conductor changes with respect to such a center. For example, in the turning region the strip conductor may be turned almost completely, such that the planar position of a given main face is rotated by approximately half a turn as it passes through the turning region. For example, the angle of rotation of the planar position when passing through the turning region can be between 160° and 200°, in particular between 170° and 190°.

The described type of simultaneous change of direction and the pronounced torsion of the strip conductor (i.e. turning), renders possible a transition, between a longitudinal limb and transverse limb of a winding, with a relatively small space requirement. In the following, the type of turn described is also referred to as a "corner turn". If such a "corner turn" is effected in a small space, it follows that the strip conductor must accordingly be bent with a small bend radius. This is at first inconsistent with the general understanding that, if possible, small bend radii are to be avoided in the case of superconducting strip conductors. In connection with the present invention, however, it has unexpectedly been found that, in the case of the described turn in combination with the change of direction, comparatively small bend radii can be tolerated by the present superconducting strip conductors without damage.

As a result of the turn being introduced at the same time as the change of direction, bending of the strip conductor within the plane of the strip is largely avoided, and instead the change of direction is effected by means of a torsion. Even in the case of bending in a relatively small space, such a torsion can be tolerated significantly better by the known strip conductors than can a corresponding bending within the plane that, in a comparable space, would result in the same change of direction. The teachings herein include the unexpected recognition that a pronounced "kink" occupying a small space—i.e. a narrowly limited corner turn—of the strip conductor can be tolerated by known strip conductors without damaging the superconductor, while at the same time avoiding bending within the plane of the strip conductor. In particular, a strip conductor having a thin superconducting layer arranged on a substrate strip can withstand such a kink, without delamination or other damage to the superconducting layer, if the bend radius is suitably selected.

The described coil device, because of the described "corner turn", allows the transition between longitudinal and transverse limbs of a coil winding to be effected in a relatively limited space, and thus results in a very small axial space requirement for the winding overhangs. In the context of the present disclosure, the winding overhangs are to be understood generally to mean the combination of the transverse limbs and the transition regions between transverse and longitudinal limbs. Overall, the placement of such "corner turns" in the coil winding renders possible the design of three-dimensionally shaped windings (in contrast to flat coils). In particular, this renders possible designs that are advantageous in connection with coil devices for low-pole rotors in electrical machines. Thus, for example, the coil winding can adapt, at least in parts, to a cylinder surface. Such a shaping has the advantage that, in the case of a low-pole rotor, the longitudinal limbs of the winding can be routed close to the equatorial plane, and the transverse limbs can nevertheless have a comparatively greater distance from this plane. For this purpose, the transverse limbs can in particular be bent in such a manner that the winding gains a greater distance from the central axis in the region of the transverse limbs.

In some embodiments, the coil device may be used in connection with a superconducting strip conductor, since here a three-dimensional shape is achieved while avoiding bending of the strip conductor within the strip plane. Broadly, however, it is also possible to wind a corresponding normally-conducting strip conductor—especially with high sensitivity to bending within the plane—in the manner described, and thereby to achieve the corresponding advantages. For example, for normally-conducting strip conductors, a reduction in grain size due to deformation, and an associated increase in the normally-conducting electrical resistance, is avoided.

In some embodiments, a rotor for an electrical machine includes at least one coil device incorporating teachings of the present disclosure. The advantages of such a rotor are analogous to the advantages of the coil device described above.

The winding carrier incorporating the teachings herein may be realized as a winding carrier for a three-dimensionally shaped coil winding. In particular, this may be a coil winding for a coil device. The winding carrier has a ring-shaped circumferential bearing contact surface for flat bearing contact of a superconducting strip conductor. The bearing contact surface in this case has at least one turning region, in which the bearing contact surface is bent such that, in this turning region, it causes a distinct change of direction in the longitudinal direction of a strip conductor in bearing contact and, at the same time, the orientation of the two main faces of a strip conductor in bearing contact changes with respect to a central axis of the coil device.

In other words, for the purpose of realizing a "corner turn", the winding carrier according to the invention is formed in a winding to be wound thereon. The advantages to be derived from this are analogous to the advantages of the coil device described above.

Some embodiments include a method for production of a superconducting coil winding. In this case, at least one turn of a superconducting strip conductor is wound onto a winding carrier described above, such that a first main face of the strip conductor comes to lie flatly circumferentially on the bearing contact surface of the winding carrier. Here, too, the advantages are analogous to the advantages of the coil device described above.

The minimum bend radius of the strip conductor within the turning region may be between 1 cm and 25 cm, in particular between 3 cm and 10 cm. The stated minimum bend radius is to be understood in this case to mean the smallest bend radius that occurs in each case over the course of the strip conductor in the entire turning region. In some embodiments, the bend radius is relatively uniform over the entire turning region. Thus, for example, the turning region may be configured in such a manner that here the strip conductor follows a curvature face that forms part of a circular cylinder surface.

A bend radius in the stated range has the advantage that, in the "corner turn", a pronounced bend is achieved in a small space but, at the same time, excessive kinking, and thus damage to the strip conductor, is avoided because of the stated lower limit. The fact that a superconducting strip conductor can be bent in the stated range of the bend radii without being damaged is unexpected, and stems from the fact that, in the case of the described corner turn, the strip conductor is not bent—or at most is bent minimally—within the plane of the strip.

If the turn is formed, not from a single strip conductor, but from a stack of mutually superimposed strip conductors, these strip conductors may also be turned collectively as a stack via the described "corner turn". In the case of such an embodiment, the described advantages of the invention are also achieved and, at the same time, a higher current can be attained in the winding.

The at least one coil winding may be saddle-shaped. Thus, in particular, in sub-regions it may be adapted to the contours of a hollow cylinder segment. One or more sub-regions of the winding may be curved out of a flat plane. In particular, these may be transverse limbs of such a winding. In some embodiments, the longitudinal limbs may be tilted out of the central coil plane.

In some embodiments, the coil device has at least one winding carrier, on which the at least one coil winding is held such that it lies on the winding carrier, at least in the at least one turning region. In this case, the winding of the strip conductor that is underneath with respect to the winding carrier is intended to lie flatly on the winding support. In some embodiments, this lower winding rests over its entire circumference on the winding carrier. Thus, the described shaping of the coil winding can be assisted particularly effectively by the winding carrier.

In some embodiments, the strip conductor may be a substrate strip having a superconducting layer arranged thereon. In some embodiments, this layer may be a high-temperature superconducting layer. High-temperature superconductors (HTS) are superconducting materials that have a transition temperature of above 25 K and, in the case of some material classes, for example cuprate superconductors, of above 77 K, with which the operating temperature can be achieved by cooling with cryogenic materials other than liquid helium. HTS materials are also particularly attractive because these materials can have very high critical current densities, depending on the choice of operating temperature.

The superconducting layer may contain, for example, second-generation HTS materials, i.e. in particular compounds of the type $REBa_2Cu_3O_x$ (REBCO for short), where RE stands for a rare-earth element or a mixture of such elements. Due to their high transition temperatures, REBCO superconductors can also be cooled with liquid nitrogen and, especially at temperatures lower than 77 K, have a particularly high current carrying capacity.

In some embodiments, the high-temperature superconducting material may include magnesium diboride. In some embodiments, the superconducting layer may have magnesium diboride as the main constituent, or may even consist substantially of magnesium diboride. Magnesium diboride has a transition temperature of approximately 39 K and is therefore regarded as a high-temperature superconductor, although the transition temperature is rather low in comparison with other HTS materials. The advantages of this material, in comparison with oxide ceramic high-temperature superconductors, are that it can be produced easily, and therefore at low cost. Conductors based on magnesium diboride can be produced particularly easily and inexpensively by aerosol deposition or by the so-called powder-in-tube method.

In some embodiments, the substrate of the strip conductor may comprise steel or a nickel-containing alloy such as, for example, Hastelloy. In general, irrespective of the exact choice of material, it may be an electrically normally conducting substrate that, in particular, can be electrically conductively connected to the superconducting layer.

The superconducting strip conductor typically has a comparatively thin superconducting layer, having a layer thickness in the micrometer range, that is deposited on the substrate. This carrier substrate essentially determines the mechanical properties of the strip conductor, since it accounts for a large part of the volume of the strip conductor. In this case, further intermediate layers may optionally be provided between the carrier substrate and the superconducting layer, for example one or more oxidic buffer layers that can positively influence the growth of the superconducting layer. In addition, the structure of carrier substrate and superconducting layer may be covered or enveloped by a normally conducting layer. In the specialist field, such a layer is often referred to as a shunt layer and may be used for electrical and/or thermal stabilization.

In some embodiments, the turning region is a spatially highly limited sub-region of the total circumference of the coil winding. For example, the sum of all turning regions present within the coil winding may account for a circumferential proportion of maximally 10% of the circumference of the winding as a whole. In some embodiments, this circumferential proportion is even maximally only 5%, in particular even maximally only 2.5%. In relation to the individual longitudinal limbs and transverse limbs, these circumferential relationships can look as follows:

The axial length of the respective longitudinal limbs may preferably be at least ten times as great as the axial length of a single turning region. This renders possible a high proportion of the electrically particularly effective region of the winding. Furthermore, the extent of the respective transverse limbs in the azimuthal direction may preferably be at least four times as great as the corresponding extent of a single turning region. These comparatively narrow dimensions of the turning regions make it possible to achieve a particularly compact design of the winding heads.

The at least one turning region may be a so-called corner region, in which a longitudinal limb of the coil winding merges into a transverse limb of the coil winding. A longitudinal limb is to be understood here to mean, in general, a winding portion that extends substantially parallel to a central axis of the coil device. By contrast, a transverse limb is to be understood to mean, in general, a winding portion that extends substantially transversely in relation to such an axis.

The at least one coil winding may generally have exactly two longitudinal limbs, extending along a central axis of the coil device. Furthermore, the coil winding may have exactly two axially terminal transverse limbs, which connect the two longitudinal limbs to each other in the two axial end regions. The coil winding then has a total of four turning regions, via which the longitudinal limbs and the transverse limbs are connected to each other. In some embodiments, in all four such turning regions, the strip conductor, which forms the winding, is bent via a corner turn in the described manner.

In the case of such a coil winding, having two longitudinal limbs and two transverse limbs, the two longitudinal limbs may have a mutually equal radial distance r1 from the central axis. Furthermore, the two transverse limbs may have a mutually equal distance r2 from the central axis. In this case, these two distances may differ from each other by a value between 2 cm and 20 cm.

In other words, the corner turn described above can result in there being a different radius for the longitudinal limbs and the transverse limbs. In this case, in principle, either the longitudinal limbs or the transverse limbs may be arranged radially further outward. In this case, the radial distance between the longitudinal limbs and the transverse limbs may correspond, for example, to the radial thickness of the winding carrier, the difference in the inner radii corresponding to the sum of the radial thickness of the winding carrier and the radial height of the winding. In particular in this case, the radial thickness of the winding carrier may correspond to approximately twice the bend radius of the strip conductor present in the turning region, since the strip conductor can be routed, for example, around a surface at an angle of approximately 180°, which may correspond substantially to a sector of a circular cylinder surface.

In some embodiments, the two longitudinal limbs may have a radial distance r1 from the central axis that is greater than the corresponding radial distance r2 of the two transverse limbs. A general advantage of this is that an arrangement of the longitudinal limbs that is radially as far out as possible results in a greater electrical efficiency. Such an outer arrangement is easier to achieve with the described variant. In the case of an internal rotor of an electrical machine, in particular, the degree of electrical interaction between the rotor and stator is then particularly high.

In some embodiments, the two longitudinal limbs may have a radial distance r1 from the central axis that is less than the corresponding radial distance r2 of the two transverse limbs. An advantage of this alternative is that it is easier in this case to provide curved transverse limbs that, for example, follow the outer contours of a circular cylindrical arrangement. If the transverse limbs, bent in this manner, are radially further out in relation to the longitudinal limbs, they can be pressed more easily from the outside by a winding tension to be applied, while retaining this curvature, onto a winding carrier that here supports from the inside and that lies radially between the transverse limbs and the longitudinal limbs. The greater cross-sectional area of the clear region near the axis, which may be used for the purposes described above, such as, for example, infeed lines, mechanical components and/or a rotor shaft.

In general, the two longitudinal limbs may be curved in an S shape in their respective axial end regions, such that the radial distance of the winding from the center of the coil device in these end regions is altered with respect to the more inner portions of the longitudinal limbs. The said inner portions of the longitudinal limbs may be, in particular, the main part of the axial length that is significantly electrically effective. The S-shaped curved axial end regions are then the regions that adjoin the winding overhangs, or even merge into the winding heads. In some embodiments, the S shape may be realized such that the radial distance from the center in the electrically effective axially inner portions is increased in comparison with the end regions. This embodiment, in the variant in which the longitudinal limbs lie further radially inward in the region, nevertheless enables a high electrical efficiency to be achieved.

In principle, however, in contrast to the two previously described "pure forms", in which the transverse limbs in each case are both either further outside or further inside than the longitudinal limbs, mixed forms are also possible. In the case of such a mixed form—as viewed from a given transverse limb—there can thus be both a turn toward radially inward and a turn toward radially outward, next to each other.

The axial length of the coil device as a whole may be between 0.5 m and 10 m, in particular between 1 m and 7 m. The radius of the coil device as a whole may preferably be between 10 and 100 cm (in the case of a rotationally symmetrical design). The rotor may be a rotor for a synchronous machine. In particular, it may be a rotor for an internal-rotor machine that can be mounted so as to be rotatable by means of a central rotor shaft.

In some embodiments, the rotor may be a low-pole rotor that, in particular, is designed to realize a magnetic field with $p=2$ or $p=4$ poles. The advantages of the teachings herein are especially applicable in the case of such a low-pole rotor, since here a three-dimensional shape of the rotor winding is particularly desirable. With such a shape, the longitudinal limbs can be arranged close to the equator, while at the same time the transverse limbs are routed such that the central region of the rotor axis is kept free of the coil winding. However, as an alternative to the stated application of the coil device in a rotor, it may also in principle be used, for example, in a stator of an electrical machine, or also in a device for generating a magnetic field.

In some embodiments, the winding carrier may be designed such that the strip conductor to be wound onto it can be wound flatly thereon with one of its two main faces.

In some embodiments, this may be effected in a continuous manner over the entire turn of the strip conductor lying at the bottom.

In some embodiments, the winding carrier may be composed of at least two segments. This subdivision may be designed in such a manner that the winding carrier can be subsequently removed from a coil winding applied to it, the coil winding being able to retain the shape defined by the bearing contact surface. Such a partitioning of the winding carrier into a plurality of segments may be necessary in particular if, after the winding has been produced, the strip conductor uninterruptedly surrounds the winding carrier such that removal of the winding carrier in one piece is no longer possible without altering the shape of the winding. By dividing the winding carrier into a plurality of segments, however, such a removal can be made possible, since the different segments can then be removed from the winding partly radially inward and partly radially outward.

In particular, such a subsequent removal may be effected after the winding has been impregnated with an impregnating agent and then cured such that a self-supporting winding is formed, which is then dimensionally stable even without the winding carrier itself. In order to facilitate the separation of such a self-supporting winding from its winding carrier, the winding carrier may, for example, be coated with a release agent before the winding is applied. Such a release agent may be, for example, a Teflon layer.

In some embodiments, a winding tension in the range between 10 N and 200 N per individual strip conductor may be used during the production of the winding. If a stack of a plurality of strip conductors is wound simultaneously, the winding tension may increase accordingly. With a winding tension in the stated range, it can be ensured that the described "corner turn" of the strip conductor is effected with sufficient dimensional stability, with overloading of the strip conductor by excessively high winding tension being avoided at the same time. In other words, the winding tension should be selected to be high enough for the described spatially small turn to be assisted by being pressed onto the winding carrier and, following attainment of this shape, to be held in place thereon.

FIG. 1 shows a schematic representation of a strip conductor 1 in a turning region 7 of a coil device incorporating teachings of the present disclosure. Such a turning region 7 may in principle occur in any region of a coil winding that is part of such a coil device. In some embodiments, the strip conductor 1 in such a turning region 7 undergoes a distinct change of direction and, in so doing, at the same time changes the orientation of its two main faces. Thus, in the region on the left in FIG. 1, the longitudinal direction of the strip conductor 1 extends along a direction a1, which is vertical in the drawing represented, while, in the part of the drawing that is on the right, it is horizontal in the drawing, in a direction a2, after having passed through the turning region 7.

Thus, here, the longitudinal direction of the strip conductor 1 is changed by approximately 90°. On the left, the strip conductor lies exactly in the surface of the drawing. On the right, it lies in a surface somewhat "above" and parallel to the surface of the drawing. At the same time, here the orientation of the strip conductor 1 becomes turned, which is exhibited in that, in the part of the drawing that is on the left, the first main face 3 is oriented toward the viewer, whereas, in the part of the drawing that is on the right, second main face 5 is oriented toward the viewer. The orientation of the main faces thus likewise changes with respect to a notional center of the coil device as a whole, which may be located, for example, on a rotor axis.

The rod 13 represented in FIG. 1 is not necessarily intended to be part of such a coil winding. It serves here only to illustrate the type of bending of the strip conductor. In particular, if the strip conductor 1 is bent as represented around such a circular cylindrical rod, the shown change of direction can be effected without unwanted bending within the plane of the strip conductor. Instead, the bending is achieved in a gentle manner, by the so-called corner turn—i.e. a simultaneous turn of the faces and change of the direction by approximately 90°. The axis of this notional rod lies in a surface parallel to the surface of the drawing, between the planes of the two shown conductor branches 11 and 9 and has an angle of approximately 45° in relation to both strip conductor directions a1 and a2.

In a real coil winding, the strip conductor 1 in such a turning region 7 may lie, not on a single round bar, but on a larger winding carrier having a similar outer shape only in this region. This winding carrier may be shaped such that the strip conductor lies on its bearing contact surface both in its comparatively straight portions and in the turning region. This bearing contact surface may preferably have, within the turning region, a contour that corresponds to a portion of a circular cylindrical surface.

To that extent, the outer face of the rod shown in FIG. 1 represents a curved surface of the winding carrier in the turning region 7 of the coil winding. Analogous to the circular cylindrical rod shown, the curved surface of the winding support in the turning region may have a substantially constant bend radius. This bend radius may be, for example, in the range of between 1 cm and 10 cm.

In FIG. 1, the two portions of the strip conductor 1 that are connected to each other by the turning region 7 are designated as a longitudinal limb 9 and as a transverse limb 11. However, these two portions do not each need to be completely straight, but may also be bent, at least partly. In some embodiments, if they are bent, they have lesser bend radii in comparison with the turning region 7.

Figure 2:
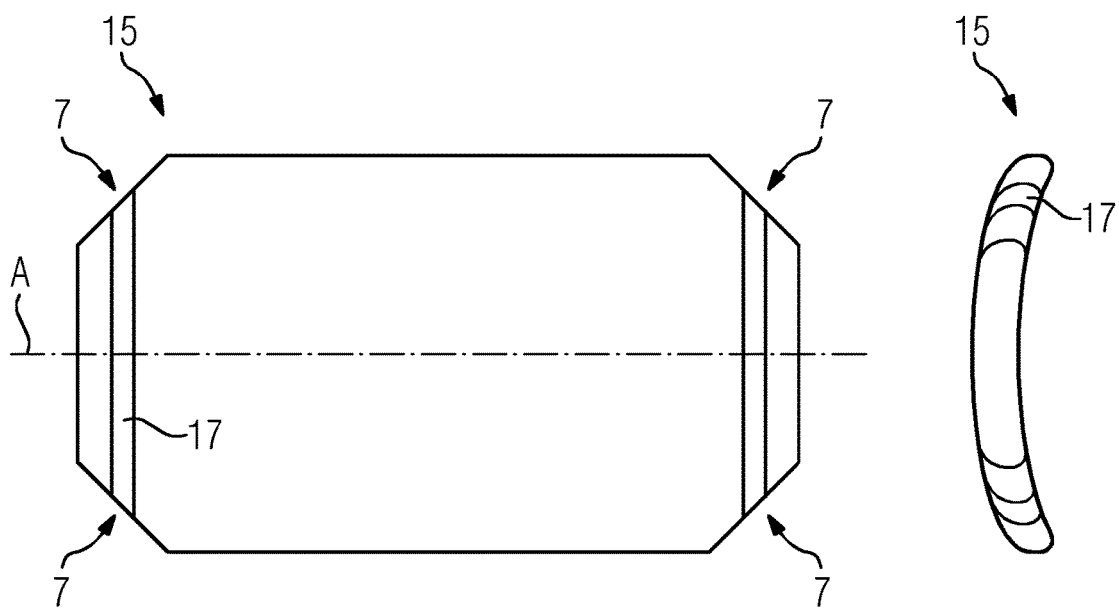
FIG. 2 shows a schematic top view and a schematic cross section of a winding carrier.

FIG. 2, in the part on the left, shows a schematic top view and, in the part on the right, shows a schematic cross section of a winding carrier 15 according to an exemplary embodiment of the teachings of the present disclosure. As can be seen from the part of FIG. 2 that is on the right, the winding carrier 15 is designed such that its basic shape replicates a part of a cylinder surface. A winding carrier shaped in such a manner may be mounted, for example together with a winding applied thereto, on a cylindrical surface of a circular cylindrical rotor of an electrical machine. For this purpose, for example, two such cylinder segments may be mounted, each at a corresponding radial distance, symmetrically around a central rotation axis A of the rotor. In the part of FIG. 2 that is on the left, such an axis A is shown, schematically, in the center, and behind the shown winding carrier 15 in the plane of the paper.

The shown winding carrier 15 has a circumferential bearing contact surface 17, onto which one or more turns of a superconducting strip conductor can be wound in a flat manner. In the part of FIG. 2 that is on the left, the two parts of the bearing contact surface 17 that belong to the transverse limbs of the winding can be seen on the winding carrier. The winding carrier 15 has four turning regions 7, in which the strip conductor to be wound thereon—as described in greater detail in connection with FIG. 1—is turned and ultimately merges into the longitudinal limbs of the winding. The associated bearing contact surfaces of these longitudinal limbs are not represented in greater detail in FIG. 2, since in the direction of viewing they run behind the winding carrier. As can be seen in FIG. 2, in the four turning regions 7 the winding carrier has rounded corners, via which a strip conductor lying thereon is routed with a predefined bend radius.

Figure 3:
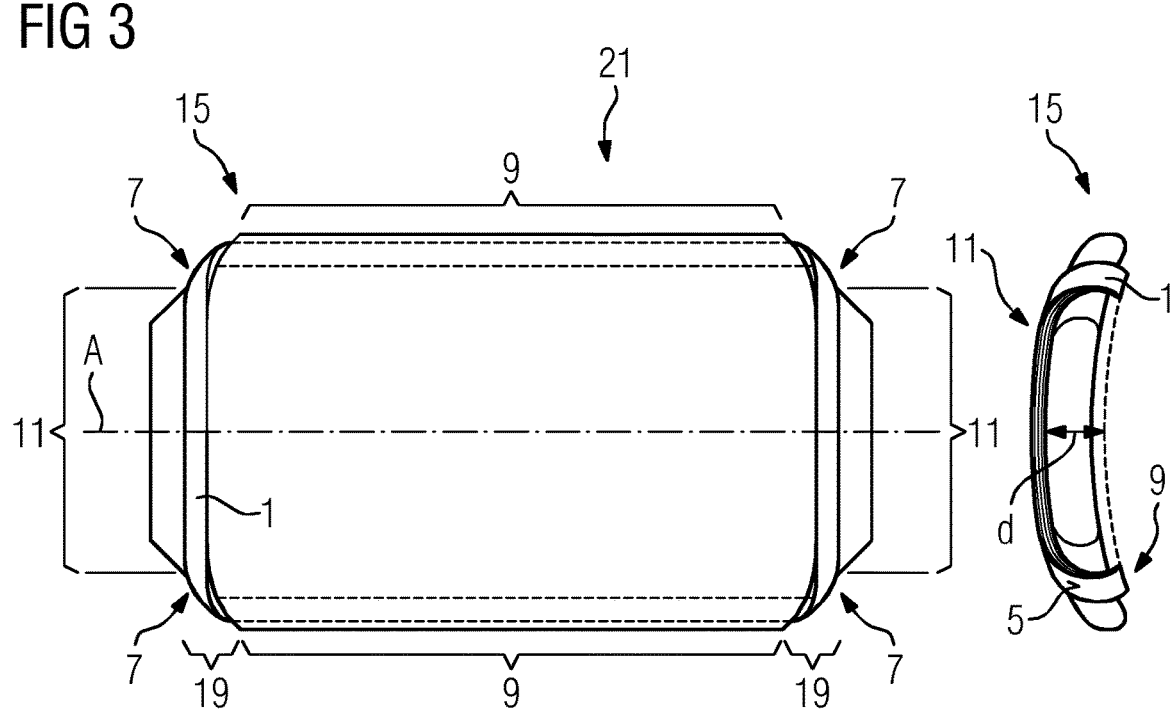
FIG. 3 shows the corresponding views of the winding carrier of FIG. 2 with a winding arranged thereon.

The described geometric relationships are elucidated yet further in connection with FIG. 3. FIG. 3 shows the corresponding two views of the winding carrier of FIG. 2, with the difference that here there is additionally a circumferential coil winding 21 arranged on the winding carrier. This coil winding 21 comprises a plurality of turns of a strip conductor 1 that are wound over one another, the lowermost of these turns lying flatly on the circumferential bearing contact surface 17 of the winding carrier.

The two longitudinal limbs 9 of the winding 21 that run behind the winding carrier 15 are indicated in this case by broken lines. These two longitudinal limbs 9 extend parallel to the direction of the central axis A of the coil device as a whole. Such a coil device as a whole may have, for example, a plurality of such coil windings 21, arranged symmetrically around this axis A.

As can be seen in the part of FIG. 3 that is on the right, the two transverse limbs 11 of the winding have a curvature that follows the curved contour of the winding carrier. With respect to this curvature of the winding carrier and the central axis A, in this case the transverse limbs 11 are radially outside, and the longitudinal limbs 9 are radially inside. The difference between the corresponding radii of the individual limbs in this case is given by the distance d, which represents the sum of the thickness of the winding carrier and the height of the winding. Overall, the winding carrier 15 is located radially between these individual limbs. In the four turning regions 7, the strip conductor 1 is bent with a comparatively small bend radius, under a predefined winding tension, around the rounded corners of the winding carrier.

Figure 4:
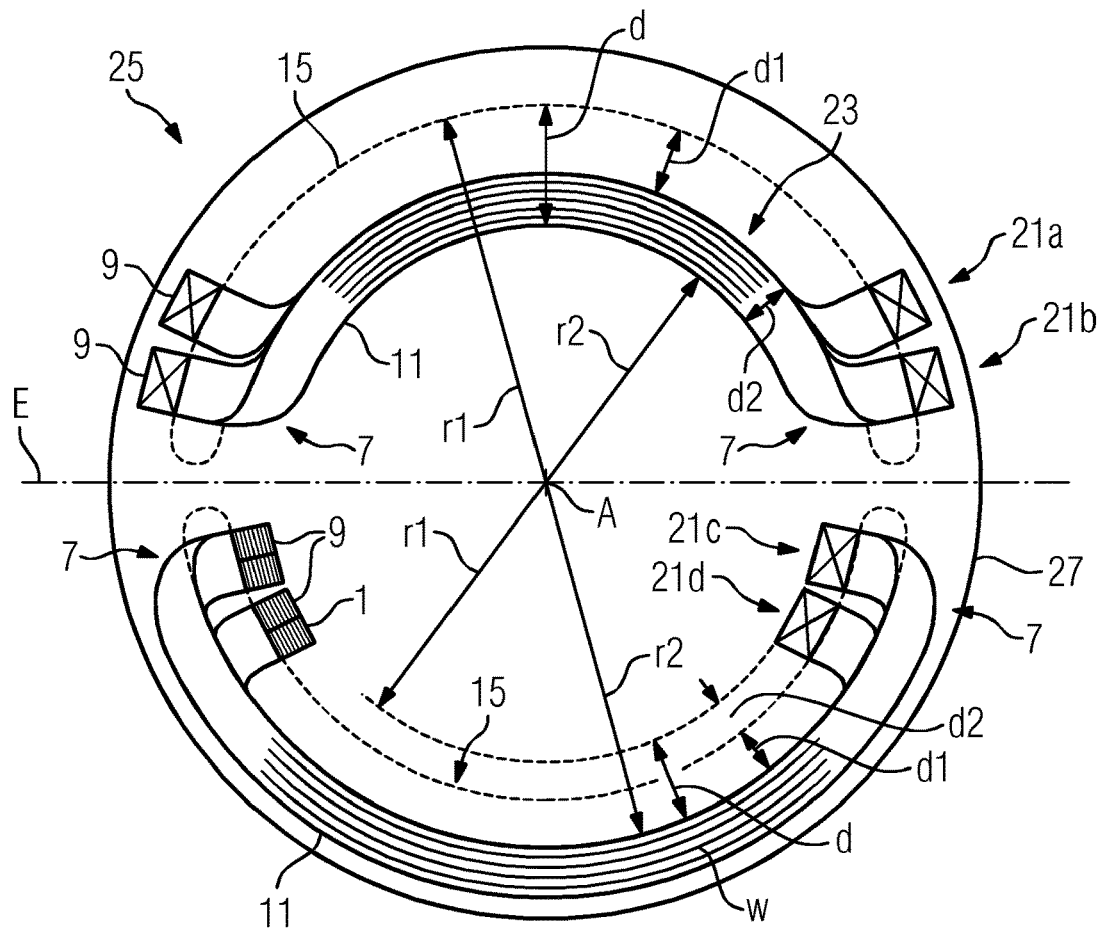
FIG. 4 shows a schematic cross section of an exemplary rotor having 4 differing coil windings.

FIG. 4 shows a schematic cross section of a rotor 25 according to a further exemplary embodiment of the teachings herein. It shows a section perpendicular to the central rotor axis A. By means of a rotor shaft, not represented here, the rotor is mounted so as to be rotatable about this central axis A and has an approximately circular cylindrical housing 27. This rotor 25 has a coil device 23, which may be designed, for example, as an excitation winding of an electrical machine. Shown by way of example here, as parts of this coil device, are four individual coil windings 21a to 21d. Shown above the equatorial plane E in this case are two coil windings 21a and 21b of a first type, in which the two longitudinal limbs 9 each have a greater radius r1 than the two transverse limbs 11 having a radius r2.

In contrast, shown beneath the equatorial plane E are two coil windings 21c and 21d of a different, second type, in which the two longitudinal limbs 9 each have a lesser radius r1 than the two transverse limbs 11 having a radius r2. Each of the coil windings shown in this case has a plurality of turns w of a superconducting strip conductor 1. In the case of a real coil device, it is in principle advantageous, in contrast to the example of FIG. 4, if a plurality of coil windings of the same type are used. The differing designs here serve here only for the purpose of illustration.

In the upper part of FIG. 4, both represented coil windings 21a and 21b are arranged on the same winding carrier 15, which here is represented by a broken line. Each of the coil windings has two longitudinal limbs 9, which each have a radial distance r1 from the central axis A. These longitudinal limbs 9 sit closely, lying radially on the outside, against the winding carrier. The two longitudinal limbs of a winding are again, in a manner similar to FIG. 3, connected via four turning regions 7 to two axially terminal transverse limbs 11, of which only the one at the front is visible in FIG. 4. The difference between the two radii r1 and r2 is given by the distance d, which again results as the sum of the radial thickness d1 of the winding carrier and the radial height d2 of the winding. It is advantageous here that the electrically effective longitudinal limbs 9 are arranged at a large radial distance r1 from the center of the rotor.

In the lower part of FIG. 4, the relationships of the radii of the limbs are exactly the inverse: the longitudinal limbs 9 sit closely, lying radially on the inside, against the winding carrier, and the transverse limbs 11 connected to them via the turning regions 7 sit closely, lying radially on the outside, against the winding carrier, such that here r2 is greater than r1. Here also, the difference between the two radii r1 and r2 is given by the distance d, which results as the sum of the radial thickness d1 of the winding carrier and the radial height d2 of the winding. In the case of this second embodiment type, the bent transverse limbs 9 are held in place on the outside of the bent winding carrier 15 by means of the winding tension used during the winding operation.

As represented schematically in the left lower part of FIG. 4, the respective windings may each not only have a plurality of superimposed turns w but may also each have a plurality of circumferentially mutually adjacent runs of strip conductors 1 (here, two mutually adjacent). This also is a possible way of achieving a higher current in the winding as a whole. In order for such a design to be made possible, the associated bearing contact surface of the winding carrier should then be widened accordingly. The width of an individual strip conductor may, in general, be between 2 mm and 40 mm, in particular between 4 mm and 12 mm. Besides individual strip conductors (and stacks of strip conductors or mutually adjacent strip conductors), in principle Roebel conductors (i.e. composite conductors composed of a plurality of transposed strip conductors) may also be used here in the winding operation.

Figure 5:
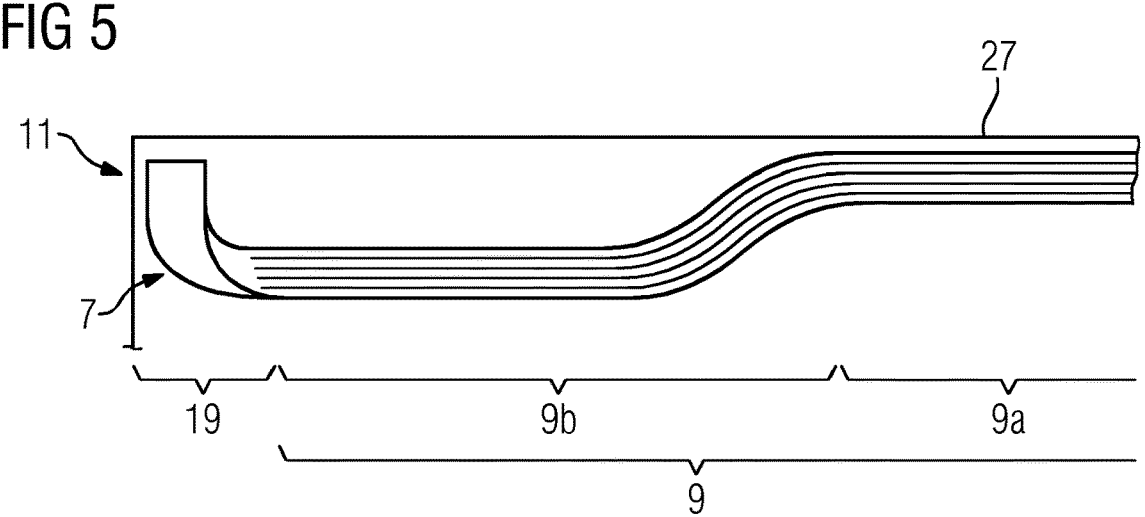
FIG. 5 shows a schematic longitudinal section of a portion of an exemplary winding.

FIG. 5 shows a schematic longitudinal section of a portion of a coil device according to a further exemplary embodiment of the teachings herein. Shown here is a radially outer region of a coil winding in such a coil device, in the region of the rotor housing 27. A turning region 7 is shown, which connects a longitudinal limb 9 and a transverse limb 11 of the winding to each other. Here, the longitudinal limb 9 has an axially inner region 9a (of which only a small part is shown) and, adjoining it, an axially terminal region 9b, in which the longitudinal limb is bent in an S shape. The bend here is realized such that the radial distance from the axis, not represented here, is reduced from the middle region 9a toward the terminal region 9b. In contrast, the turning region 7 is configured such that the radial distance increases again toward the transverse limb 11. This advantageously achieves the effect that, despite the—as viewed from the transverse limb—inwardly directed turning, a major part of the longitudinal limbs 9 can be arranged on a relatively large radius of the rotor.

What is claimed is:

1. A superconducting coil device comprising:
 a strip conductor with a first main face and a second main face; and
 a winding carrier comprising:
  an extended rigid structure with a primary dimension extending along a longitudinal axis;
  the extended rigid structure having a curve transverse to the longitudinal axis defining at least a portion of a hollow cylinder;
  the extended rigid structure having two primary sides extending parallel to the longitudinal axis and two secondary sides extending transverse to the longitudinal axis;
  the extended rigid structure having four contact sides transitioning from a respective one of the two primary sides to a respective one of the two secondary sides;
 wherein the four contact sides define a ring-shaped circumferential bearing contact surface for flat bearing contact of a superconducting strip conductor wherein the contact surface extends parallel to the two secondary sides along a convex exterior surface of the extended rigid structure and parallel to the two primary sides along a concave interior surface of the extended rigid structure; and
 wherein the bearing contact surface defines at least two turning regions in which the bearing contact surface is bent such that, in this turning region, it causes a distinct change of direction in a direction of a strip conductor in bearing contact in reference to the longitudinal axis and, at the same time, the orientation of the two main faces of the strip conductor in bearing contact changes with respect to the longitudinal axis; and
 wherein the strip conductor comprises a substrate strip and a high-temperature superconducting layer arranged on the substrate strip.

2. The coil device as claimed in claim 1, wherein the minimum bend radius of the strip conductor within the turning region is between 1 cm and 25 cm.

3. The coil device as claimed in claim 1, wherein the turning region comprises a spatially limited sub-region of the total circumference of the coil winding.

4. The coil device as claimed in claim 1, wherein:
 the two primary sides have a mutually equal radial distance from the longitudinal axis; and
 the two secondary sides have a mutually equal radial distance from the longitudinal axis ;
 the two radial distances differ from each other by a value of between 2 cm and 20 cm.

5. The coil device as claimed in claim 4, wherein the two longitudinal limbs have a radial distance from the longitudinal axis greater than the corresponding radial distance of the two transverse limbs.

6. The coil device as claimed in claim 4, wherein the two longitudinal limbs have a radial distance from the longitudinal axis less than the corresponding radial distance of the two transverse limbs.

7. The coil device as claimed in claim 1, wherein the two primary sides are each curved in an S shape in their axial end regions, such that the radial distance of the winding from the longitudinal axis in these end regions is altered with respect to the more inner portions.

8. A winding carrier for a three-dimensionally shaped coil winding, the winding carrier comprising:
 an extended rigid structure with a primary dimension extending along a longitudinal axis;
 the extended rigid structure having a curve transverse to the longitudinal axis defining at least a portion of a hollow cylinder;
 the extended rigid structure having two primary sides extending parallel to the longitudinal axis and two secondary sides extending transverse to the longitudinal axis;
 the extended rigid structure having four contact sides transitioning from a respective one of the two primary sides to a respective one of the two secondary sides;

wherein the four contact sides define a ring-shaped circumferential bearing contact surface for flat bearing contact of a superconducting strip conductor wherein the contact surface extends parallel to the two secondary sides along a convex exterior surface of the extended rigid structure and parallel to the two primary sides along a concave interior surface of the extended rigid structure; and wherein the bearing contact surface defines at least two turning regions in which the bearing contact surface is bent such that, in this turning region, it causes a distinct change of direction in a direction of a strip conductor in bearing contact in reference to the longitudinal axis and, at the same time, the orientation of the two main faces of the strip conductor in bearing contact changes with respect to the longitudinal axis.

9. The winding carrier as claimed in claim 8, wherein the winding carrier includes at least two segments, in such a manner that it can subsequently be removed from a coil winding applied to it, wherein the coil winding retains the shape defined by the bearing contact surface.

10. A rotor for an electrical machine, the rotor comprising:
a superconducting coil device with a strip conductor with a first main face and a second main face; and
a winding carrier comprising:
an extended rigid structure with a primary dimension extending along a longitudinal axis;
the extended rigid structure having a curve transverse to the longitudinal axis defining at least a portion of a hollow cylinder;
the extended rigid structure having two primary sides extending parallel to the longitudinal axis and two secondary sides extending transverse to the longitudinal axis;
the extended rigid structure having four contact sides transitioning from a respective one of the two primary sides to a respective one of the two secondary sides;
wherein the four contact sides define a ring-shaped circumferential bearing contact surface for flat bearing contact of a superconducting strip conductor wherein the contact surface extends parallel to the two secondary sides along a convex exterior surface of the extended rigid structure and parallel to the two primary sides along a concave interior surface of the extended rigid structure; and
wherein the bearing contact surface defines at least two turning regions in which the bearing contact surface is bent such that, in this turning region, it causes a distinct change of direction in a direction of a strip conductor in bearing contact in reference to the longitudinal axis and, at the same time, the orientation of the two main faces of the strip conductor in bearing contact changes with respect to the longitudinal axis; and
wherein the strip conductor comprises a substrate strip and a high-temperature superconducting layer arranged on the substrate strip.

11. The rotor as claimed in claim 10, configured to realize a magnetic field having p poles, wherein p is equal to 2 or 4.

\* \* \* \* \*